United States Patent Office
2,844,782
Patented July 22, 1958

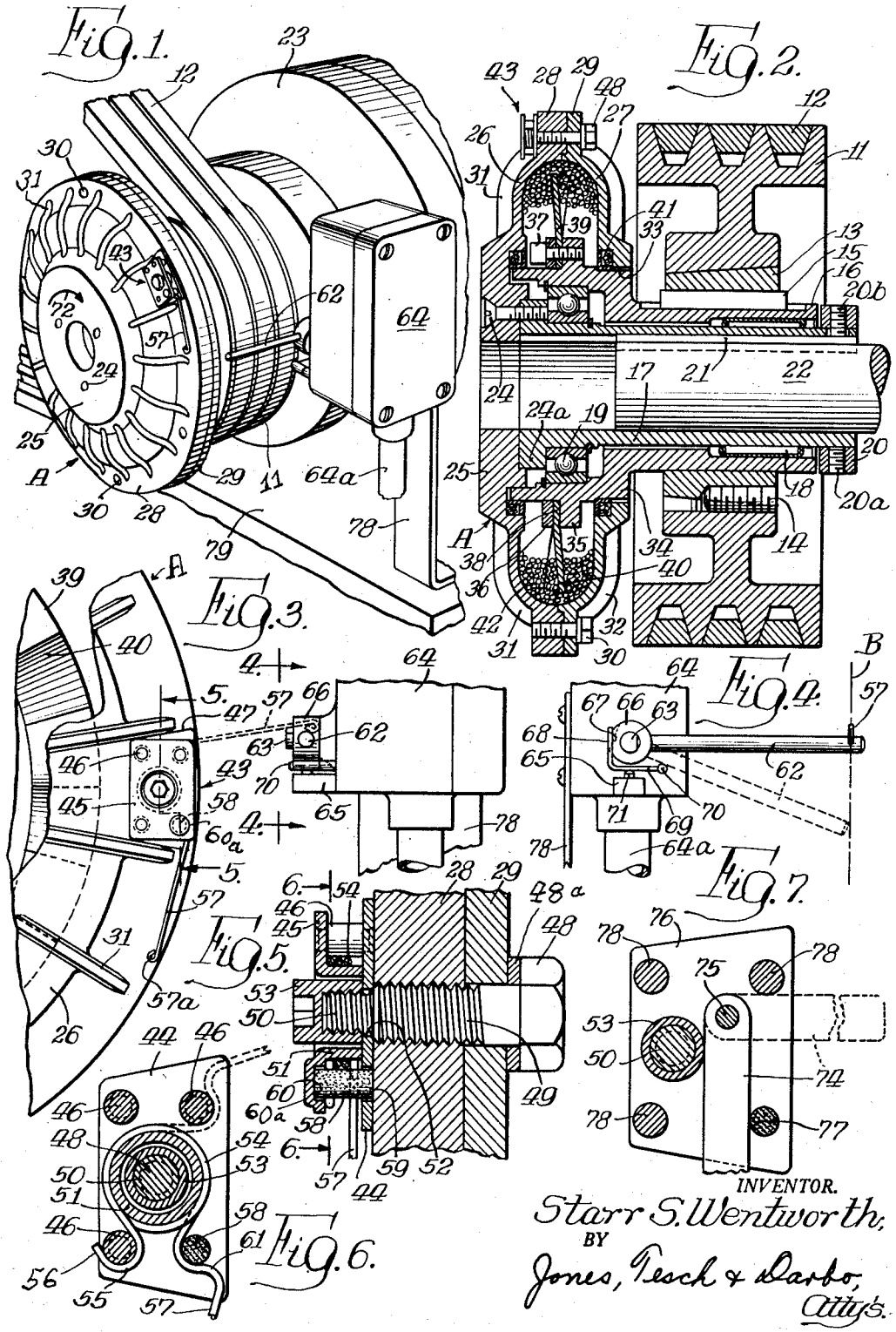

2,844,782

POWER TRANSMISSION UNITS WITH THERMAL OVERLOAD CUTOUT

Starr S. Wentworth, Mishawaka, Ind., assignor to Dodge Manufacturing Corporation, Mishawaka, Ind., a corporation of Indiana Application May 31, 1956, Serial No. 588,350

8 Claims. (Cl. 318—472)

The present invention relates to power transmission units with thermal overload cutout.

In an important aspect, this invention provides a heat responsive device associated with a power transmission unit, including a part having rotary motion, for shutting off the power to said unit upon the occurrence of a predetermined temperature level in the part. When the temperature of the part, as for example as a result of overload, jamming or the like, rises substantially above normal, the cutout comes into play, the part being permitted to continue to move, after the cutout acts, under the influence of inertia, until it comes to a stop, thus guarding against damage to expensive equipment.

The invention is especially adaptable to rotary or revolving units in which heat of friction, when it occurs, is localized in a moving part. It has particular utility for use with a power transmission unit comprising a rotatable housing, an initially relatively rotatable enclosed rotor and a discrete flow charge such as, for example, fine particles of spherical steel or iron shot, adapted to be thrown by centrifugal force to the periphery of the housing to compact about the vane of the rotor to establish a driving connection between the rotor housing and the rotor.

In the illustrative embodiments of the invention here described by way of example, a member, such as a spring or weight, carried by the moving part, is constantly urged, as by resilience or centrifugal force or a combination thereof, to one predetermined position, but is normally held in another predetermined position by a heat responsive detent such as a fuse plug or thermal pin, said detent releasing the member in the event of a substantial rise in the temperature of the unit, the member thereupon acting to trip or trigger a switch element to "off" position while continuing to move with the unit.

The invention will be understood, and the foregoing, and more specific objects thereof, will be pointed out, by reference to the following detailed description, taken together with the accompanying drawings, of exemplary embodiments of the invention here shown, and in which drawings—

Figure 1 is a perspective view of a motor and a power transmission unit for a machine drive, with expedients illustrating the present invention associated therewith;

Figure 2 is an enlarged axial section of the unit;

Figure 3 is a fragmentary segmental view showing a portion of the unit periphery carrying an embodiment of the present invention for cooperation with complementary circuit controlling means mounted on the motor base;

Figure 4 is an enlarged fragmentary front view of parts shown in Figure 3, taken on the line 4—4 thereof;

Figure 5 is a cross-section on an enlarged scale taken on the line 5—5 of Fig. 3;

Figure 6 is a cross-section taken on the line 6—6 of Fig. 5; and

Figure 7 shows a modification.

Referring in detail to the illustrative construction shown in the drawings, which also exemplify one useful application of the invention, the numeral 11 indicates a sheave for a conventional multiple V-belt drive 12 for any desired machinery or the like. The sheave 11 is here shown mounted on a tapered (Fig. 2) bushing 13 to which it is secured by a locking screw 14. The bushing 13 is keyed as at 15 to rotate with a hub 16 that in this instance is carried through needle bearings 18 and ball bearings 19, on a sleeve 17, the hub and sleeve being at times relatively rotatable. The sleeve 17 carries a retaining collar 20 held to the sleeve by a set screw 20a. The sleeve 17 is keyed as at 21 to rotate with the shaft 22 of a prime mover, in this instance typified by an electric motor indicated generally by the numeral 23. Set screw 20b holds key 21 in position.

In accordance with an invention pertaining to a novel clutch device indicated generally by the letter A, which is the subject-matter of a patent application other than the present application, the sleeve 17 has rigidly mounted thereon, as by screws 24 passing into a terminal enlargement 24a of the sleeve, a rotor housing 25 that is formed in two complementary dished parts 26 and 27, these parts being held together, at their flanged peripheries 28 and 29 respectively, by screws 30. The rims of the parts 26 and 27 are desirably reinforced by the radial ribs 31 and 32 respectively. The rotor housing part 27 is centrally apertured as at 33 to provide entrance for the cuplike enlargement 34 of the rotatable hub 16 that is received in the housing, this enlargement 34, within the housing, having an annular flange 35 to which is clamped, by retaining ring 36 and screws 37, the inner periphery 38 of a circular rotor 39 that has a wave-like or sinuous vane portion 40. The rotor housing 25 and the rotor 39 (being rigid respectively with sleeve 17 and hub 16) are at times relatively rotatable and rotary seals 41 are interposed between these parts, in addition to the ball bearings 19.

When the motor 23 is started and the shaft 22 revolves, the rotor housing 25 revolves with it, at first relatively to the rotor 39, but, as the speed of the motor shaft and rotor housing increases, an enhanced multiplicity of particles of a discrete flow charge material 42, such as steel or iron shot, of about eleven thousandths of an inch diameter, with which the rotor housing is suitably provided, is thrown into the interior peripheral portion of the rotor housing by centrifugal force and is compacted about the sinuous periphery of the rotor 39. The greater the speed the greater the density of the flow charge and the more firmly the rotor vane 40 is gripped. When the centrifugal force reaches a predetermined value the rotor will rotate with the rotor housing without slippage therebetween, and the rotor in turn drives the hub 16 and through it the sheave 11 for the belts 12, thus affording smooth starting with economy of power and protection against shocks and the like. If, however, the driven belts 12 encounter excessive resistance, by reason for example of overloading or jamming of the machine arranged to be driven thereby, the motor 23 meanwhile continuing to run, slippage will occur between the rotor vane 40 and the rotor housing 25, which, if continued for an extended period will build up a high degree of heat in the flow charge 42 by friction between it and the vane 40 of the rotor and this if allowed to continue will destroy the rotor and flow charge.

The present invention has for its purpose to provide an automatic circuit discontinuing means that will shut off the current to the motor in the event of such overloads as build up a predetermined degree of heat transfer from the flow charge 42 to the rotor housing periphery, through which the heat tends to dissipate. A description of one specific embodiment of such means, illustrated in Figures 1 to 6 of the drawings, will now be given.

In accordance with the present invention, secured on the rim of the clutch device A, and, in this instance, on the housing part 26, between two of the ribs 31, is a heat responsive device indicated in general by the numeral 43 which in this instance comprises a relatively small frame or casing made up of a pair of plates 44 and 45 secured together at a predetermined distance apart, at three of the corners of the casing, by spacer rivets 46. The rivets 46 occur at three of the corners of the casing respectively. The inner plate 44 is tapered on its lateral edges as at 47 to correspond to the flare of the radial ribs 31 and to fit snugly between two of these ribs between which is located a screw hole for one of the screws 30. To mount the device 43 in this position, the ordinary screw 30 is omitted at this point and a special screw bolt 48 is here employed that has a relatively large threaded shank part 49 to pass through the housing part periphery 29 and which screws into the housing part periphery 28 similarly to the ordinary screws 30, but the special screw bolt 48 has a reduced threaded extension 50 that protrudes beyond the housing part periphery 28, through the plate 44 and into a tubular boss 51 on the casing plate 45 located centrally of the latter and bridging the gap between the plates 44 and 45, the plate 44 having a reduced opening 52 of smaller diameter than the tubular boss 51, so that a nut such as the Allen nut 53 can be screwed onto the threaded shank extension 50, passing through the boss 51 and into clamping engagement with the margin of the plate 44 surrounding the opening 52 therein, thus securely and readily clamping the device 43 to the rotor housing part 26 when the nut 53 is tightened. The ribs 31 prevent it from rotating on the screw bolt 48. The bolt 48 may be tensioned by a spring washer 48a.

Ase best seen in Fig. 6 and in accordance with one form of the invention, the tubular boss 51 provides a winding spool for a coiled spring steel wire element 54 that has its inner end 55 bent and anchored as at 56 about one of the radially innermost spacer rivets 46. The spring 54 thus functions as a torsion spring and its outer end 57 acts as a retractable and extensible spring finger occupying two alternative positions, depending upon whether the heat responsive device 43 is activated or unactivated. For the spring 54 a material known as Amco 17—7 stainless steel wire .035 diameter has been found suitable. To avoid a sharp point on the spring finger 57, the latter is desirably turned upon itself as at 57a to provide a rounded termination.

In the unactivated position of the heat responsive device 43 the spring finger 57 is held retracted within the periphery of the housing part 26 by a heat responsive detent in the form of a thermal pin or fuse plug 58 that is inserted into registering holes 59 and 60 in the casing plates 44 and 45, respectively, that are located at an outer or fourth corner of the casing where a rivet 46 is omitted. The thermal pin 58 bridges the gap between the plates and prevents outward extended movement of the spring finger 57 which it normally abuts on the outer side of the spring. The spring finger 57 is desirably bent in a reverse or ogee curve as at 61 where it passes around the thermal pin 58, thus providing a pocket in the spring for the pin. The hole 60 has a beaded margin 60a defining a receiving recess for convenience in locating the pin 58 therein.

The thermal pin 58 is advantageously made of a metal having a relatively low melting point which may range from say 270° F. to 280° F. in one useful application of the invention, but it is to be understood that this melting point is selectively variable as herein later discussed. It has been found that a material known at Belmont low melting alloy No. 7451, being a composition of tin, lead, cadmium and bismuth is suitable in one instance. The thermal pin 58 may have a diameter of say from one-eighth to one-quarter of an inch and a length of say from one-quarter to three-eighths of an inch. Desirably its length is such that when pressed into the openings 59 and 60 its inner end will contact the housing part 28 for good thermal conductivity, the pin having a free but not too loose fit in the holes in the plates.

Upon melting or fusing of the thermal pin 58 the spring finger 57 is no longer restrained and springs outwardly to a somewhat radial position extending beyond the periphery of the cluth device A as shown in broken lines in Fig. 3. Upon the next time around in the rotation of the clutch device, the spring finger 57 finds in its path the striker arm 62 that is pivotally mounted as by a trunnion 63 on an electric switch box 64 that has suitable mechanism for controlling, through cable 64a, the circuit for the motor 23. In shunt from the circuit of the motor is a switch mechanism having two selective positions and here shown as a conventional normally closed micro-switch 65 which, as is well known, may be suitably arranged to be in control of the motor circuit controlled by the switch box 64. Such micro-switch and controlling and controlled circuits may be arranged as shown in application of Jackson Chung entitled "Power Transmission Units with Overload Release Means," Serial No. 255,274, filed November 7, 1957, now Patent No. 2,753,969.

The trunnion 63 is somewhat of the swivel type in that rigid with the striker arm 62 is a generally cylindrical cam knuckle 66 that has a flat 67 that normally bears against the angularly turned end 68 of an actuator lever 69 that is pivoted at 70 on the switch box 64. The lever 69 is in engagement with a depressible contact actuating spring plunger 71 carried by the micro-switch 65. If the striker arm 62 be swung in either direction it will cause rotation of the cam knuckle 66 so as to cause a portion of the circular periphery of the cam knuckle to press on the actuator lever end 68 the latter thereby leaving the flat 67, and causing the actuator lever 69 to be depressed on its pivot 70 to in turn depress the contact actuating spring plunger 71 of the micro-switch which has a normally uppermost position, thus discontinuing the circuit through the micro-switch, this in turn breaking the control circuit through the switch box 64. The motor being thus deprived of power will gradually run down as the inertia in its driven shaft 22 is dissipated. By consequent cessation of rotation of the clutch device A the frictional movement between the flow charge and the rotor vane will cease and the temperature in the periphery of the device A will drop back to normal without damage to the mechanism.

The spring finger 57 may then be manually retracted to its unactivated position within the periphery of the clutch device A and a new thermal pin inserted to retain the spring finger in unactivated position ready for the next emergency. As explained in said Chung application the micro-switch 65 may then be restored to "on" position, when the cause of the jamming has been corrected, by moving the striker arm 62 back to the position shown in full lines in Fig. 4, at which time the actuator lever end 68 will abut the cam flat 67 on the cam knckle 66, allowing the contact actuating spring plunger 71 of the micro-switch to return to uppermost position as shown, but without closing the circuit controlled by the switch box 64, which circuit will not be closed until this is done manually, as further explained in said Chung application, to restart the motor 23.

While the thermal cutout device 43 is adapted to function, in cooperation with the striker arm 62, with the motor shaft rotating in either direction, in this instance it may be assumed that the motor shaft is operating in the direction indicated by the arrow 72 and that when the spring finger 57 moves outwardly, upon melting of the thermal pin 58, the spring finger strikes the striker arm 62 on the upper side of the latter as shown in broken lines in Fig. 3, the spring finger 57 being held in this position against its own resilience by the adjacent radially outermost spacer rivet 46 (Fig. 6).

The path of the spring finger 57 is in a plane indicated at B (Fig. 4) normal to the plane in which the striker arm 62 moves. As shown in broken lines in Fig. 4, when the spring finger 57 strikes the striker arm 62, the latter is moved down out of the path of the spring arm, so that the clutch device A may continue to rotate under the influence of inertia without the spring finger striking the striker arm a second time until the device is re-set for resumed operation.

In the modification shown in Fig. 7, the spring 54 with its spring finger 57 is shown replaced by a weighted tappet bar 74 that is pivoted at 75 on the back plate 76 that corresponds to the back plate 44 of the device 43. In the modification of Fig. 7, the front plate of the heat responsive device, having the back plate 76, may omit the boss 51. The tappet 74 is inactively retained on one side by the nut 53 and is held within the periphery of the clutch device A by the thermal pin 77 corresponding to the thermal pin 58 in Fig. 5. When the thermal pin 77 fuses as a result of a predetermined high temperature at the periphery of the device A as already described, centrifugal force arising from rotation of the device A, will throw the tappet 77 radially outwardly into abutment with the radially outermost spacer rivet 78, thus bracing the tappet, which, upon next revolution of the device will strike the striker arm 62 to actuate the micro-switch 65 to "off" position from its normally closed position, in the same manner as would the spring finger 57.

In the case of either the spring finger 57 or the weighted tappet 74, each acts as a trigger finger to actuate, through the striker arm 62, the micro-switch 65, in response to excess heat built up in the periphery of the device A due to friction from slippage between the flow charge of the device and the vane of the rotor arising from overloading or jamming of the driven machine.

While a melting range for the thermal pin of 270° F. to 280° F. is suggested hereinabove, it will be understood that a thermal pin having a different melting point may be employed to suit a different condition, and this may be varied say anywhere between 200° F. and 350° F. To avoid destruction of the flow charge and rotor vane it may well be observed that the temperature of the flow charge might reach 400° F. to 500° F. before the temperature of the rotor housing where contacted by the thermal pin would reach say 280° F. The composition, i. e., the proportions of tin, lead, cadmium and bismuth, for the thermal pin, may be varied to vary the melting point.

The striker arm 62 is desirably of a material such as aluminum which will not spark when struck, or it may be covered with a non-conductive material.

The switch box 64 is here shown carried by bracket 78 suitably mounted on the motor base 79.

The micro-switch 65 here referred to as normally closed could be arranged to be of the normally open type while still being in controlling relation to the circuit controlled by the switch box 64, as will be understood in the art.

It will of course be understood that in normal operation of the drive, the extensible member, whether it be the spring finger 57 or the weighted tappet bar 74, is held within the perimeter of the device A so as not to contact the striker arm 62.

The device of the present invention may not only function to stop the motor but may be arranged to flash a signal or sound a horn or buzzer or to perform all of said functions, by well known electrically controlled expedients.

Patent applications on the device A, as above alluded to, have been made in the name of Ferdinand Badin, Serial No. 217,927, now Patent No. 2,771,170; Serial No. 412,308; and Serial No. 461,855.

Illustrative embodiments of the invention being here described, such adaptations, including modifications or additions, may be made as incorporate what is defined in the appended claims without departing from the invention.

The invention having been described, what is here claimed is:

1. Power transmission unit with thermal overload cutout, comprising a motor, a hollow rotor housing having a sleeve part rigid therewith fixed on the shaft of the motor, a hub telescoped on the housing sleeve and relatively rotatable thereon, a sheave on said hub, a rotor rigid with said hub enclosed in said housing and having a vane projecting into the periphery thereof, a discrete flow charge in said housing displacable by centrifugal force toward the periphery of the housing during rotation of the rotor housing to compact about said vane to establish a driving connection between the housing and the rotor, a device exteriorly carried by the housing adjacent its periphery having a member urged to a position beyond the periphery of the housing, said device including a heat responsive detent noramlly retaining the member within the said periphery, and switch mechanism carried by the motor having two selective positions and having an element arranged to be tripped by said member when the latter is beyond the said periphery to actuate the switch to one of said selective positions.

2. Power transmission unit with thermal overload cutout, comprising, a motor, a hollow rotor housing having a sleeve rigid therewith fixed on the shaft of the motor, a hub telescoped on the housing sleeve and relatively rotatable thereon, a sheave on said hub, a rotor rigid with said hub enclosed in said housing and having a vane projecting into the periphery thereof, a discrete flow charge in said housing displaceable by centrifugal force toward the periphery of the housing during rotation of the rotor housing to compact about said vane to establish a driving connection between the rotor housing and the rotor, a device exteriorly carried by the housing having a member urged to one position under conditions of a predetermined degree of heat in said rotor housing, said member in the absence of said predetermined heat in the housing occupying another position, and switch mechanism having two selective positions and having an element arranged to be tripped by said member when the latter is occupying said one member position to actuate the switch to one of said switch positions.

3. The structure of claim 2 wherein the predetermined degree of heat is of the order of from 270° F. to 280° F.

4. The structure of claim 2 wherein the predetermined degree of heat is between 200 and 350 degrees F.

5. Power transmission unit with thermal overload cutout, comprising, a rotatable power transmission part, a heat responsive device carried by said part and having a member arranged to travel in either of two different radially spaced apart circular paths, means urging said member into a first of said paths at a predetermined temperature level in said part, said member at another tempertaure level in said part remaining in a second of said paths, switch mechanism mounted independently of said part having two selective positions, an element associated with said switch mechanism arranged to be tripped by said member when in said first path to place the switch in one of said switch positions, said first path being a path in which said element lies, said element being moved out of said path by said tripping action whereby said part may continue to move in the first path after the cutout is operative, said heat responsive device including a heat fusible detent normally holding said member in said second path against the force of said urging means.

6. The structure of claim 5 wherein the said member is urged by spring means.

7. The structure of claim 5 wherein the said member is urged by centrifugal force.

8. A thermal overload cutout comprising a retractable and extensible spring finger, said spring finger being an extension of a wire coil spring, a thermally fusible pin carried by said cutout normally maintaining the spring finger retracted, said fusible pin releasing said finger under the influence of a predetermined heat increment to permit said finger to move to an extended position, wherein there are a pair of parallel plates mounting the spring therebetween, spacer rivets at three corners of the plates, a winding spool for the spring extending between said plates, the thermally fusible pin extending between the plates at their fourth corner and normally abutting the spring finger to restrain the finger, the inner end of the spring being anchored on one of said rivets, and another of said rivets providing a stop abutment for the spring.

References Cited in the file of this patent

UNITED STATES PATENTS

| | | |
|---|---|---|
| 1,253,071 | Marino | Jan. 8, 1918 |
| 2,539,534 | Eckhardt | Jan. 30, 1951 |